(12) United States Patent
Heo et al.

(10) Patent No.: US 12,240,170 B2
(45) Date of Patent: Mar. 4, 2025

(54) NOZZLE DEVICE FOR FDM-TYPE 3D PRINTER

(71) Applicant: BIOFRIENDS INC., Seoul (KR)

(72) Inventors: Dong Nyoung Heo, Seoul (KR); Il Keun Kwon, Seoul (KR)

(73) Assignee: BIOFRIENDS INC. (KR)

( * ) Notice: Subject to any disclaimer, the term of this patent is extended or adjusted under 35 U.S.C. 154(b) by 181 days.

(21) Appl. No.: 18/010,806

(22) PCT Filed: Jun. 7, 2021

(86) PCT No.: PCT/KR2021/007080
§ 371 (c)(1),
(2) Date: Dec. 15, 2022

(87) PCT Pub. No.: WO2021/256757
PCT Pub. Date: Dec. 23, 2021

(65) Prior Publication Data
US 2023/0249404 A1 Aug. 10, 2023

(30) Foreign Application Priority Data
Jun. 16, 2020 (KR) .................. 10-2020-0073070

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/264* (2017.08);
(Continued)

(58) Field of Classification Search
CPC .................................................. B29C 64/209
See application file for complete search history.

(56) References Cited

FOREIGN PATENT DOCUMENTS

| CN | 110366485 A | 10/2019 |
|---|---|---|
| CN | 110621476 A | 12/2019 |

(Continued)

OTHER PUBLICATIONS

International Search Report for PCT/KR2021/007080, mailed Sep. 1, 2021.

*Primary Examiner* — Atul P. Khare
(74) *Attorney, Agent, or Firm* — Renaissance IP Law Group LLP

(57) ABSTRACT

An embodiment of the present disclosure provides a nozzle device for an FDM-type 3D printer, comprising: a filament supply unit to which filaments for FDM are supplied; a filament nozzle which is positioned under the filament supply unit and melts the filaments supplied from the filament supply unit to output molten filaments; a heater block which is provided around the filament nozzle to melt the filaments inside the filament nozzle; a gas tank; an aerosol generation unit which generates a nanoparticle aerosol; a plasma generation unit which generates plasma; and a plasma nozzle through which the plasma is ejected to the molten filaments, wherein the nanoparticle aerosol generated in the aerosol generation unit flows, together with the gas in the gas tank, to the plasma generation unit through a transfer pipe, and the molten filaments are surface-treated by using the plasma generated in the plasma generation unit and nanoparticles.

10 Claims, 3 Drawing Sheets

(51) Int. Cl.
  *B29C 64/264*   (2017.01)
  *B29C 64/295*   (2017.01)
  *B29C 64/30*    (2017.01)
  *B29C 64/336*   (2017.01)
  *B29C 64/371*   (2017.01)
  *B33Y 10/00*    (2015.01)
  *B33Y 30/00*    (2015.01)
  *B33Y 40/10*    (2020.01)

(52) U.S. Cl.
  CPC ............ *B29C 64/295* (2017.08); *B29C 64/30* (2017.08); *B29C 64/336* (2017.08); *B29C 64/371* (2017.08); *B33Y 10/00* (2014.12); *B33Y 30/00* (2014.12); *B33Y 40/10* (2020.01)

(56)                References Cited

FOREIGN PATENT DOCUMENTS

| | | |
|---|---|---|
| JP | 2019031083 A | 2/2019 |
| KR | 20170033978 A | 3/2017 |
| KR | 20180003141 A | 1/2018 |
| KR | 20190042434 A | 4/2019 |
| KR | 20200063369 A | 6/2020 |
| KR | 102207315 B1 | 1/2021 |

NOZZLE DEVICE FOR FDM-TYPE 3D PRINTER

TECHNICAL FIELD

The present disclosure relates to a nozzle device for a FDM-type 3D printer, and more particularly, to a nozzle device for a FDM-type 3D printer having a plasma nozzle.

BACKGROUND ART

A FDM-type 3D printer, which manufactures an object by semi-melting solid plastic materials at high temperatures, employs a method in which a filament-type material is injected with increased temperature of a nozzle and layers are formed with the output material to manufacture a three-dimensional object, and by breaking away from the existing manufacturing methods such as mold and injection, it is possible to drastically reduce the cost of manufacturing a prototype.

The FDM-type 3D printer is used in various fields such as culture, art, architecture, and design, and recently, studies in the field of biotechnology have been conducted on production of bioactive scaffolds for bone tissue regeneration using 3D printers.

Specifically, a bioactive scaffold for regenerating bone tissues is a biomaterial capable not just of filling a bone defect site through transplantation and filling in a damaged or missing bone site, but also of inducing or regenerating new bone from neighboring autogenous bone to the bone defect site, and when the bioactive scaffold is manufactured using a 3D printer, it is possible to customize the bioactive scaffold for a patient.

Conventionally, a bioactive scaffold for bone tissue regeneration have been manufactured using polycaprolactone (PCL) or polylactic-co-glycolate (PLGA), which are excellent in biodegradability and biocompatibility, but there is an disadvantage that the effect of bone tissue regeneration is somewhat insufficient.

In addition, the existing FDM-type 3D printers have a problem in that a nozzle is often clogged. The vicinity of the nozzle is maintained at a very high temperature in order to melt a filament, which is a base material, and when the temperature around the nozzle is transferred to an upper part of the nozzle, a supply path through which the filament is supplied is heated together. As a result, the filament in the supply path melts and overflows, and after cooling, the melted filament is solidified, thereby clogging the nozzle. In particular, PCL has a low melting point, so when PCL is used as the filament, it is necessary to effectively dissipate heat around the supply path.

In order to address this problem, a cooling fan or the like may be installed in the supply path through which the filament, which is the base material, is supplied, but there is another problem that the internal structure of the 3D printer becomes more complicated due to the installation of the cooling device.

DISCLOSURE

Technical Problem

The present disclosure provides a nozzle device for an FDM-type 3D printer, the device capable of modifying the surface of an artificial scaffold manufactured by an FDM-type 3D printer to improve a bone tissue regeneration ability.

In addition, The present disclosure also provides a nozzle device for a FDM-type 3D printer, the device capable of efficiently dissipating heat transmitted to a filament supply unit.

Technical Solution

In one aspect, there is provided a nozzle device for a FDM-type 3D printer, the device including: a filament supply unit to which a filament for FDM is supplied; a filament nozzle positioned under the filament supply unit and melting the filament supplied from the filament supply unit to output the molten filament; a heater block installed around the filament nozzle to melt the filament inside the filament nozzle; a gas tank; an aerosol generation unit configured to generate nanoparticle aerosol; a plasma generation unit configured to generate plasma; and a plasma nozzle for discharging plasma to the molten filament. The nanoparticle aerosol generated in the aerosol generation unit flows to the plasma generation unit through the transfer pipe together with the gas in the gas tank. The molten filament is surface-treated by using the plasma and nanoparticles generated from the plasma generation unit.

In one embodiment, an end of the plasma nozzle may be directed toward the molten filament.

In one embodiment, the gas tank may include a valve capable of adjusting a gas flow rate.

In one embodiment, the valve may be regulated so that the gas flows at a flow rate of 10 to 25 L/min.

In one embodiment, the gas tank may include compressed air, nitrogen gas, helium gas or argon gas.

In one embodiment, the aerosol generation unit may form a gold nanoparticle aerosol.

In one embodiment, a heat dissipation unit may be disposed on an outer periphery of the filament supply unit, the heat dissipation unit may be formed as a helical concave-convex portion, and the transfer pipe wraps around the filament supply unit along the heat dissipation unit.

In one embodiment, a cross section of the helical concave-convex portion may be composed of a rectangular screw thread and a rectangular screw root.

In one embodiment, a diameter of the transfer pipe may be greater than or equal to a diameter of the helical concave-convex portion.

In one embodiment, the heat dissipation unit and the transfer pipe may be formed of a Teflon material.

Advantageous Effects

According to one aspect of the present disclosure, by modifying a surface of a molten filament output from a filament nozzle, it is possible to improve the ability of an artificial scaffold to regenerate bone tissues.

In addition, by wrapping a transfer pipe through which a fluid flows in the filament supply unit, it is possible to efficiently dissipate heat transferred to the filament supply unit without a separate cooling fan.

That is, it is possible to efficiently dissipate the heat transferred to the filament supply unit at the same time as the surface of the molten filament output from the filament nozzle is modified.

Effects of the present disclosure are not limited to the above effects, and it should be construed that the effect of the present invention includes all effects which can be inferred from the constitution of invention described in the detailed description or claims of the present invention.

MODE FOR DISCLOSURE

Figure 1:
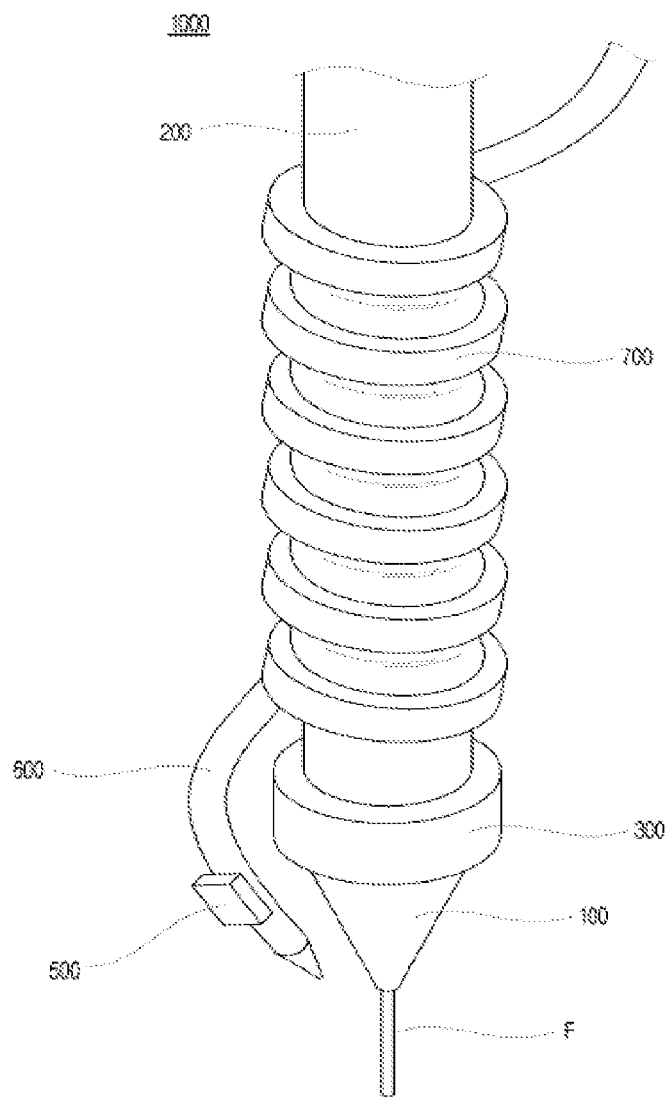
FIG. 1 is a perspective view of a nozzle device for an FDM-type 3D printer according to an embodiment of the present disclosure.

Hereinafter, the present disclosure will be described with reference to the accompanying drawings. However, the present disclosure may be modified in various different ways, and the present disclosure is not limited to the described exemplary embodiments. Moreover, the part not related to the description will be omitted in order to clearly describe the present disclosure, and like reference numerals designate like elements throughout the specification.

In the specification, when a part is "connected" with other parts, it includes "direct connection" as well as "indirect connection" in which the other member is positioned between the parts. In addition, unless explicitly described to the contrary, the word "comprise", such as "comprises" or "comprising" will be understood to imply the inclusion of stated elements but not the exclusion of any other elements.

Hereinafter, a first embodiment of the present disclosure will be described in detail with reference to the accompanying drawings.

First, a filament supply unit 200 is composed of a tube having a constant diameter, and a filament nozzle 100 is positioned at a lower end of the filament supply unit 200. A tube having a diameter equal to a diameter of the filament supply unit 200 is formed at one end of the filament nozzle 100, and a nozzle tip having a gradually decreasing diameter is formed at the other end. In addition, the filament nozzle 100 is open toward a bottom. In addition, a heater block 300 for melting a filament in the filament nozzle 100 is positioned around one end of the filament nozzle.

In detail, the filament supply unit 200 communicates with the filament nozzle 100 from which the molten filament F is output, and the filament in the form of a thread is supplied from a supply module (not shown) to the filament supply unit 200 and then supplied to the filament nozzle 100, and the filament is melted while passing through the heater block 300 positioned around the filament nozzle 100.

Meanwhile, in the present disclosure, in order to modify a surface of the molten filament F output from the filament nozzle 100, an aerosol generation unit 900, a gas tank 800, a transfer pipe 600, a plasma nozzle 400, and a plasma generation unit 500 is included.

In detail, the aerosol generation unit 900 may generate nanoparticle aerosol required for surface modification. For example, if the aerosol generation unit 900 is configured as a nebulizer generating device, nanoparticle aerosol may be easily generated from a nanoparticle solution accommodated in a nebulizer generating device.

The gas tank 800 may be filled with compressed air, nitrogen gas, helium gas, argon gas or other inert gas, but most preferably with ordinary air. Preferably, the gas tank 800 may include a valve 810 to control a gas flow rate.

In this case, since the flow rate of gas through the transfer pipe 600 is controlled according to the opening degree of the valve 810, an opening degree of the valve 810 may be controlled considering the characteristics of the filament and a state of the plasma generation unit 500 and, if necessary, may be controlled in conjunction with the plasma generation unit 500.

Preferably, the valve 810 may be controlled so that gas flows at 10 to 25 L/min through the transfer pipe 600.

Meanwhile, PCL, PLGA, PLA, ABS, and the like may be used as the filament, but it is most preferable to use PCL or PLGA, which has excellent biocompatibility and biodegradability, as the filament.

In addition, a plasma generation unit 500 is formed in the transfer pipe 600 to generate plasma inside the transfer pipe 600, and a plasma nozzle 400 configured to gradually decrease in diameter is formed at an end of the transfer pipe 600.

In detail, the gas tank 800, the aerosol generation unit 900, and the plasma generation unit 500 are sequentially connected by the transfer pipe 600. Accordingly, the gas in the gas tank 800 and the nanoparticle aerosol generated in the aerosol generation unit 900 may flow to the plasma generation unit 500 along the transfer pipe 600, and the plasma generated in the plasma generation unit 500 may contact the molten filament F together with the nanoparticles, whereby the nanoparticles are embedded in the surface of the molten filament F.

Preferably, the aerosol generation unit 900 accommodates a solution of gold nanoparticles, from which gold nanoparticle aerosol may be generated. The gold nanoparticles are excellent in bone tissue regeneration, and thus, when the surface of the molten filament is modified using the gold nanoparticle aerosol, the bone tissue regeneration ability of an artificial scaffold is improved.

Meanwhile, preferably, the present disclosure may include an adjusting member (not shown) capable of adjusting an angle and a position of the transfer pipe 600. By the adjusting member, the plasma nozzle 400 positioned at the end of the transfer pipe 600 may be directed to a lower portion of the filament nozzle 100, and the transfer pipe 600 may be separated from the heater block 300.

More preferably, the adjusting member may be provided in the filament supply unit 200. In this case, the transfer pipe 600 is dependent on the movement of the filament supply unit 200.

In this case, the plasma nozzle 400 positioned at the end of the transfer pipe 600 is moved together with the filament nozzle 100, and thus, regardless of a moving direction of the filament nozzle 100, the surface modification may be performed by the plasma nozzle 400 at the same time as the molten filament F is output from the filament nozzle 100. Accordingly, it is possible to manufacture a structure in which nanoparticles are uniformly formed.

Next, a nozzle device for a 3D printer according to a second embodiment of the present disclosure will be described. With the transfer pipe 600 according to the second embodiment, it is possible to achieve an effect of cooling the filament supply unit 200.

In this regard, when the heat of the filament nozzle 100 heated by the heater block 300 is transferred to the filament supply unit 200 positioned at the top, the filament may melt and overflow before the filament is transferred to the inside of the filament nozzle 100, and after cooling, the melted filament may be solidified, thereby clogging the nozzle.

Since the transfer pipe 600 of the present disclosure wraps and cools the filament supply unit 200, the above phenomenon may be prevented.

In detail, the heat supplied by the heater block 300 is directly transferred to a filament supply pipe, increasing the temperature of the filament supply pipe. In this case, gas of the gas tank 800 and nanoparticle aerosol flow inside the transfer pipe 600, and when the transfer pipe 600 wraps around the filament supply unit 200, the heat transferred to the filament supply unit 200 is transferred to the transfer pipe 600 and a fluid inside the transfer pipe 600. That is, the heat of the filament supply pipe may be efficiently dissipated through the fluid inside the transfer pipe 600.

In this case, a heat dissipation unit 700 and the transfer pipe 600 must be formed of a material having a strong ability to withstand and dissipate heat, that is, a material with strong heat resistance. This is because the heat dissipation unit 700 should withstand the heat transmitted from the filament nozzle 100 and dissipate the heat again through the transfer pipe 600. Thus, the heat dissipation unit 700 and the transfer pipe 600 are preferably formed of Teflon having excellent heat resistance, but aspects of the present disclosure are not limited thereto, and the heat dissipation unit 700 and the transfer pipe 600 may be formed of other materials having excellent heat resistance.

Figure 2:
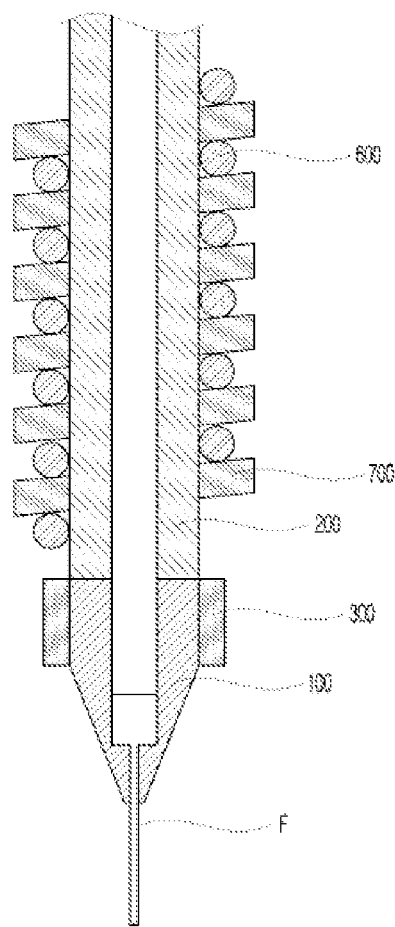
FIG. 2 is a cross-sectional view of FIG. 1.
Figure 3:
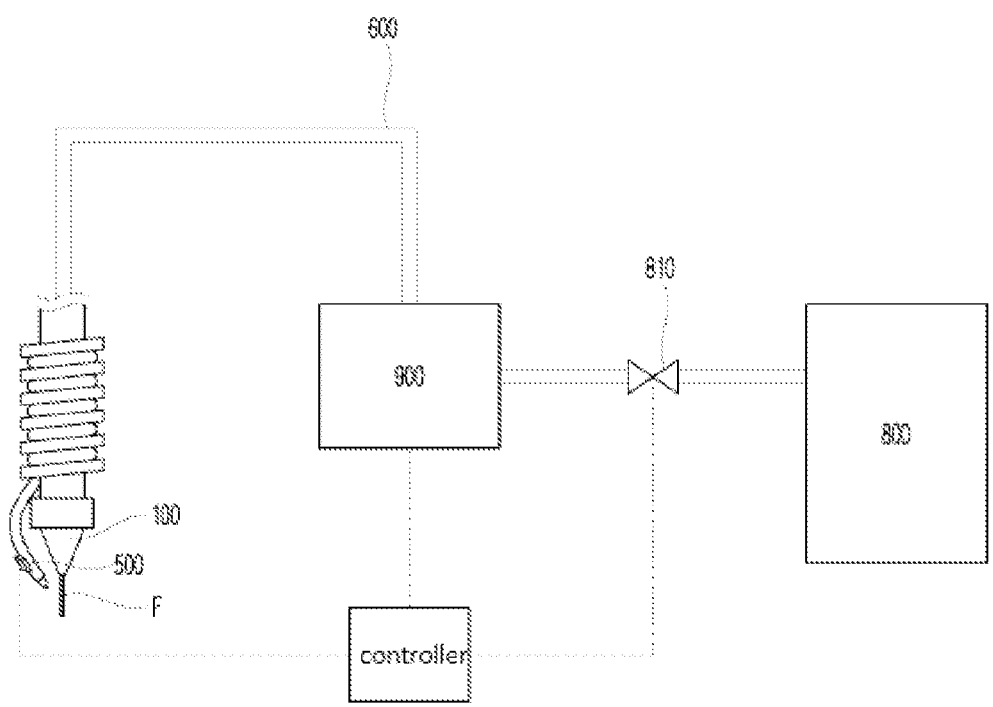
FIG. 3 is a configuration diagram in which a gas tank, an aerosol generation unit, a controller, and a valve are added to FIG. 1.

Meanwhile, as shown in FIGS. 1 and 2, a helical concave-convex portion 700 protruding outward is formed in an outer periphery of the filament supply unit 200 as a heat dissipation unit 700, and the transfer pipe 600 may wrap around the filament supply unit 200 along the concave-convex portion.

Accordingly, an area where the filament supply unit 200 and the transfer pipe 600 contact each other may be expanded, and the heat transferred to the filament supply unit 200 by the heater block 300 may be more efficiently dissipated.

More preferably, the helical concave-convex portion 700 is composed of a rectangular screw thread and a rectangular screw root having a rectangular cross section, and a diameter of the transfer pipe 600 may be greater than or equal to a diameter of the helical concave-convex portion 700.

In detail, when the cross section of the helical concave-convex portion 700 is rectangular, the transfer pipe 600 is inserted into the helical concave-convex portion 700 to enlarge an area in contact with the helical concave-convex portion 700, and thus, heat transfer efficiency may be increased. In addition, since the diameter of the transfer pipe 600 is greater than the diameter of the helical concave-convex portion 700, when the transfer pipe 600 is inserted into the helical concave-convex portion 700, it is possible to fix the transfer pipe 600 to the helical concave-convex portion 700 without any fixing member.

In summary, in the nozzle device for a 3D printer according to the second embodiment of the present disclosure, it is possible to efficiently dissipate the heat transferred to the filament supply unit 200 while transferring gas and nanoparticle aerosol to the plasma generation unit 500 through the transfer pipe 600.

The above description of the present disclosure is for illustrative purposes, and it will be understood by those skilled in the art that various changes in form and details may be made therein without departing from the spirit and scope of the present disclosure as defined by the appended claims. Therefore, the foregoing embodiments should be understood as being illustrative but not limitative purposes. For example, some parts described as being located in a single physical entity can be implemented as being distributed to a plurality of physical devices, and in the same fashion, some parts described as being distributed to a plurality of physical devices can be located in a single physical entity.

The scope of the present disclosure is defined not by the detailed description but by the appended claims, and all modifications and alterations derived from the concept, the range, and the equivalents of the claims will be construed as being included in the scope of the present disclosure.

DETAILED DESCRIPTION OF MAIN ELEMENTS

100: filament nozzle
200: filament supply
300: heater block
400: plasma nozzle
500: plasma generation unit
600: transfer pipe
700: heat dissipation unit (helical concave-convex portion)
800: gas tank
810: valve
900: aerosol generation unit
1000: nozzle device for FDM-type 3D printer
F: molten filament

The invention claimed is:

1. A nozzle device for an FDM-type 3D printer, the device comprising:
- a filament supply unit to which a filament for FDM is supplied;
- a heat dissipation unit having a concave-convex portion;
- a transfer pipe wrapped around the filament supply unit along the concave-convex portion;
- a filament nozzle positioned under the filament supply unit and melting the filament supplied from the filament supply unit to output the molten filament;
- a heater block installed around the filament nozzle to melt the filament inside the filament nozzle;
- a gas tank;
- an aerosol generation unit configured to generate nanoparticle aerosol;
- a plasma generation unit configured to generate plasma; and
- a plasma nozzle for discharging the plasma to the molten filament,
- wherein the nanoparticle aerosol generated in the aerosol generation unit flows to the plasma generation unit through the transfer pipe together with the gas in the gas tank, and
- wherein the molten filament being output from the filament nozzle is surface-treated by the nanoparticles and the plasma generated from the plasma generation unit.

2. The nozzle device of claim 1, wherein an end of the plasma nozzle is directed toward the molten filament.

3. The nozzle device of claim 1, wherein the gas tank comprises a valve capable of adjusting a gas flow rate.

4. The nozzle device of claim 3, wherein the valve is regulated so that the gas flows at a flow rate of 10 to 25 L/min.

5. The nozzle device of claim 1, wherein the gas tank comprises compressed air, nitrogen gas, helium gas, or argon gas.

6. The nozzle device of claim 1, wherein the aerosol generation unit forms a gold nanoparticle aerosol.

7. The nozzle device of claim 1, wherein:
- the heat dissipation unit is disposed on an outer periphery of the filament supply unit,
- the concave-convex portion of the heat dissipation unit is formed as a helical concave-convex portion, and
- the transfer pipe is inserted into the helical concave-convex portion.

8. The nozzle device of claim 7, wherein a cross section of the helical concave-convex portion is composed of a rectangular screw thread and a rectangular screw root.

9. The nozzle device of claim 8, wherein a diameter of the transfer pipe is greater than or equal to a diameter of the helical concave-convex portion.

10. The nozzle device of claim 7, wherein the heat dissipation unit and the transfer pipe are formed of a Teflon material.

* * * * *